US008902950B2

(12) United States Patent
Anand et al.

(10) Patent No.: US 8,902,950 B2
(45) Date of Patent: Dec. 2, 2014

(54) APPARATUS AND METHOD FOR PILOT ESTIMATION

(71) Applicant: QUALCOMM Incorporated, San Diego, CA (US)

(72) Inventors: Raghavendra Shyam Anand, Hyderabad (IN); Yegnesh Srinivasan, Hyderabad (IN); Deepti Mani, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 13/725,056

(22) Filed: Dec. 21, 2012

(65) Prior Publication Data
US 2014/0044153 A1 Feb. 13, 2014

Related U.S. Application Data

(60) Provisional application No. 61/680,839, filed on Aug. 8, 2012.

(51) Int. Cl.
H04B 1/00 (2006.01)
H04B 1/7097 (2011.01)
H04L 25/02 (2006.01)

(52) U.S. Cl.
CPC .......... H04B 1/7097 (2013.01); H04L 25/0202 (2013.01); H04L 25/0226 (2013.01)
USPC ............................. 375/147; 327/164; 370/203

(58) Field of Classification Search
CPC .................. H04W 56/0025; H04W 1/7073
USPC ....................................................... 375/147
See application file for complete search history.

(56) References Cited

U.S. PATENT DOCUMENTS 7,181,185 B2 2/2007 Park et al.
8,050,237 B2 * 11/2011 Kong et al. ................... 370/335

(Continued)

FOREIGN PATENT DOCUMENTS

CN 2927512 Y 7/2007
EP 1289163 A2 3/2003

(Continued)

OTHER PUBLICATIONS

Qaraqe K.A., et al., "Channel estimation algorithms for third generation W-CDMA communication systems," IEEE VTS 53rd Vehicular Technology Conference, 2001, vol. 4, pp. 2675-2679.

(Continued)

Primary Examiner — Santiago Garcia

(57) ABSTRACT

Methods and apparatus for wireless communication in a wireless communication network that includes receiving a synchronization channel (SCH) signal (including a primary synchronization channel (PSCH) signal, a secondary synchronization channel (SSCH) signal, and a primary scrambling code (PCH) signal) and a part of a common pilot channel (CPICH) signal in the same portion of the slot of the frame. The aspects include determining and summing the PSCH signal, SSCH signal, and PCH signal corresponding to the portion of the slot of the frame. The aspects also include de-spreading the pilot symbol over the portion of the slot of the frame based on the summed PSCH signal, the SSCH signal, and the PCH signal and estimating an estimated pilot symbol for the portion of the slot of the frame, where the estimated pilot symbol is a sum of the de-spread PSCH signal, de-spread SSCH signal, and de-spread PCH signal.

26 Claims, 12 Drawing Sheets

(56) References Cited

U.S. PATENT DOCUMENTS

| | | | |
|---|---|---|---|
| 8,238,482 B2* | 8/2012 | Chen et al. | 375/340 |
| 2003/0169702 A1 | 9/2003 | Ryu et al. | |
| 2005/0190735 A1* | 9/2005 | Shinoda | 370/342 |
| 2009/0034484 A1* | 2/2009 | Kong et al. | 370/335 |
| 2009/0122839 A1* | 5/2009 | Luo et al. | 375/145 |
| 2009/0296680 A1* | 12/2009 | Suzuki et al. | 370/342 |
| 2010/0128642 A1* | 5/2010 | Bossler et al. | 370/280 |
| 2011/0075711 A1* | 3/2011 | Hasegawa | 375/147 |
| 2012/0230301 A1* | 9/2012 | Medles et al. | 370/335 |
| 2013/0294425 A1* | 11/2013 | SONG et al. | 370/338 |

FOREIGN PATENT DOCUMENTS

| | | |
|---|---|---|
| EP | 1605601 A1 | 12/2005 |
| EP | 2306657 A2 | 4/2011 |
| WO | 2011035961 A1 | 3/2011 |
| WO | WO-2011052704 A1 | 5/2011 |

OTHER PUBLICATIONS

International Search Report—PCT/US2013/054182—ISA/EPO—Oct. 31, 2013.

* cited by examiner

APPARATUS AND METHOD FOR PILOT ESTIMATION

CLAIM OF PRIORITY UNDER 35 U.S.C. §119

The present Application for patent claims priority to U.S. Provisional Application No. 61/680,839 entitled "APPARATUS AND METHOD FOR PILOT ESTIMATION" filed Aug. 8, 2012, and assigned to the assignee hereof and hereby expressly incorporated by reference herein.

BACKGROUND

1. Field

Aspects of the present disclosure relate generally to wireless communication systems, and more particularly, to an apparatus and method of pilot estimation in a wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. One such desired enhancement of the user experience relates to removing interference when a user equipment (UE) is communicating with the UMTS network via improving pilot estimation in a wireless communication system.

Therefore, methods and apparatuses are needed for improving pilot estimation in a wireless communication system through to removing interference when a UE is communicating with the UMTS network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of improving pilot estimation in a wireless communication system is offered. The method includes receiving a synchronization channel (SCH) signal in a portion of a slot of a frame, the SCH signal including a primary synchronization channel (PSCH) signal, a secondary synchronization channel (SSCH) signal, and a primary scrambling code (PCH) signal. Further, the method includes receiving part of a common pilot channel (CPICH) signal in a same portion of the slot of the frame as the SCH signal, wherein the CPICH signal includes a pilot symbol. Also, the method includes determining the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot. Moreover, the method includes summing the determined PSCH signal, SSCH signal, and PCH signal over the portion of the slot of the frame, and de-spreading the pilot symbol over the portion of the slot of the frame based on the summed PSCH signal, the SSCH signal, and the PCH signal. Additionally, the method includes estimating an estimated pilot symbol for the portion of the slot of the frame such that the estimated pilot symbol is a sum of the de-spread PSCH signal, de-spread SSCH signal, and de-spread PCH signal.

In another aspect, an apparatus of improving pilot estimation in a wireless communication system includes a processor configured to receive a synchronization channel (SCH) signal in a portion of a slot of a frame, the SCH signal including a primary synchronization channel (PSCH) signal, a secondary synchronization channel (SSCH) signal, and a primary scrambling code (PCH) signal. Further, the processor is configured to receive part of a common pilot channel (CPICH) signal in a same portion of the slot of the frame as the SCH signal, wherein the CPICH signal includes a pilot symbol. Also, the processor is configured to determine the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot. Moreover, the processor is configured to sum the determined PSCH signal, SSCH signal, and PCH signal over the portion of the slot of the frame, and de-spread the pilot symbol over the portion of the slot of the frame based on the summed PSCH signal, the SSCH signal, and the PCH signal. Additionally, the processor is configured to estimate an estimated pilot symbol for the portion of the slot of the frame such that the estimated pilot symbol is a sum of the de-spread PSCH signal, de-spread SSCH signal, and de-spread PCH signal.

Additionally, in another aspect, an apparatus includes means for receiving a synchronization channel (SCH) signal in a portion of a slot of a frame, the SCH signal including a primary synchronization channel (PSCH) signal, a secondary synchronization channel (SSCH) signal, and a primary scrambling code (PCH) signal. Further, the apparatus includes means for receiving part of a common pilot channel (CPICH) signal in a same portion of the slot of the frame as the SCH signal, wherein the CPICH signal includes a pilot symbol. Also, the apparatus includes means for determining the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot. Moreover, the apparatus includes means for summing the determined PSCH signal, SSCH signal, and PCH signal over the portion of the slot of the frame, and means for de-spreading the pilot symbol over the portion of the slot of the frame based on the summed PSCH signal, the SSCH signal, and the PCH signal. Additionally, the apparatus includes means for estimating an estimated pilot symbol for the portion of the slot of the frame such that the estimated pilot symbol is a sum of the de-spread PSCH signal, de-spread SSCH signal, and de-spread PCH signal.

Still further, a computer-readable media that may include machine-executable code for receiving a synchronization channel (SCH) signal in a portion of a slot of a frame, the SCH signal including a primary synchronization channel (PSCH) signal, a secondary synchronization channel (SSCH) signal, and a primary scrambling code (PCH) signal. Further, the code may be executable for receiving part of a common pilot channel (CPICH) signal in a same portion of the slot of the frame as the SCH signal, wherein the CPICH signal includes a pilot symbol. Also, the code may be executable for determining the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot. Moreover, the code may be executable for summing the determined PSCH signal, SSCH signal, and PCH signal over the portion of the slot of the frame, and de-spreading the pilot symbol over the portion of the slot of the frame based on the summed PSCH signal, the SSCH signal, and the PCH signal. Additionally, the code may be executable for estimating an estimated pilot symbol for the portion of the slot of the frame such that the estimated pilot symbol is a sum of the de-spread PSCH signal, de-spread SSCH signal, and de-spread PCH signal.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As indicated above, a desired enhancement of the user experience is to improve pilot estimation in a wireless communication system through to removing interference when a UE is communicating with the UMTS network.

Prior to the present apparatuses and methods, techniques for performing channel estimation resulted in inaccurate or otherwise noisy estimates based on the presence of the SCH signal in the first 256 chips of a slot, and hence in the first pilot symbol estimation in a given slot. Because the SCH signal in WCDMA is not orthogonal to the other channels, and because the SCH signal occupies the first 256 chips of every slot, the presence of the SCH signal causes interference to other channels, especially the pilot on CPICH. Some prior techniques sought to address this problem by estimating and canceling the SCH signal before de-spreading the pilot in the pilot channel estimation process. In doing so, however, these prior techniques failed to use the energy in the SCH signal.

In contrast to prior solutions, the present apparatuses and methods recognize a commonality in that the SCH and CPICH transmit a same symbol. The present apparatuses and methods uncover the SCH, and add energy in SCH symbol coherently with the CPICH symbol. As a result, the present apparatus and methods provide a method of pilot channel estimation that increases the signal-to-noise (SNR) of the CPICH symbol, thereby leading to improved pilot channel estimates.

Thus, apparatuses and methods are provided for improving pilot channel estimates via increasing the SNR of the CPICH symbol, thereby leading to enhance communication between the UE and the UMTS network.

Figure 1:
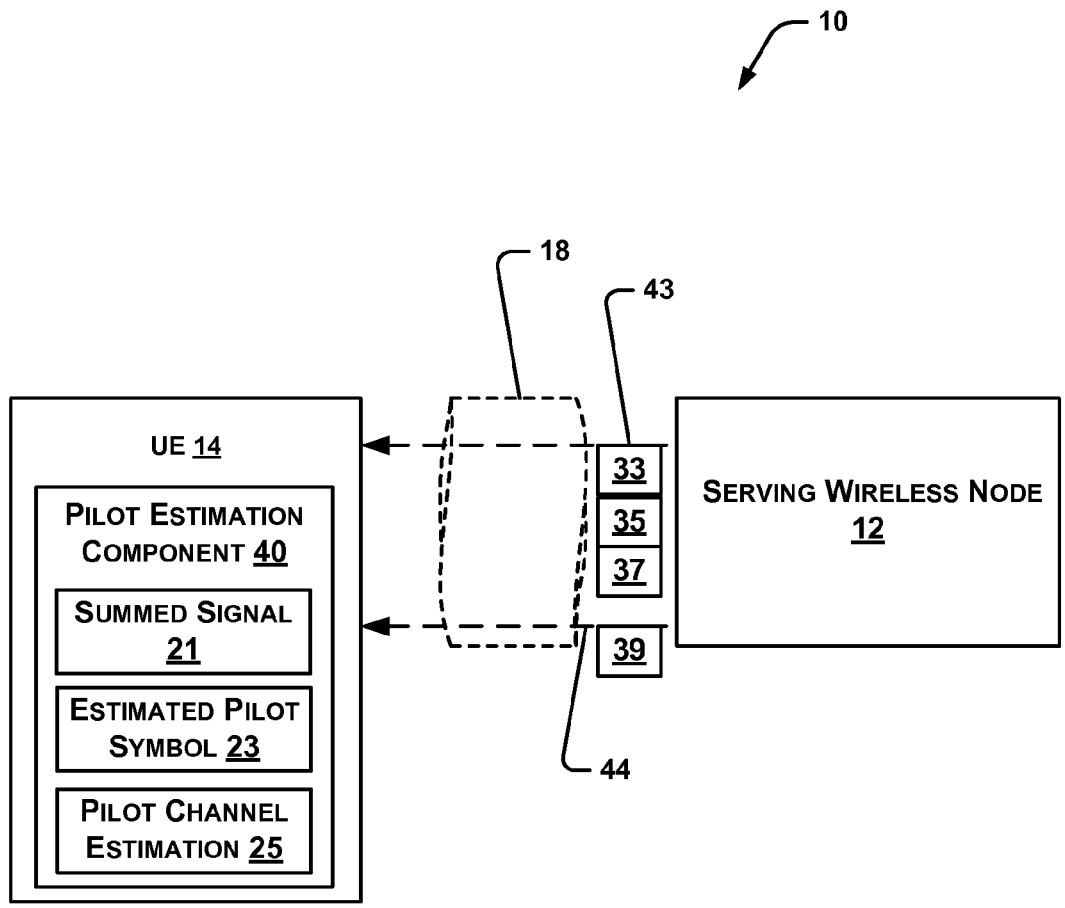
FIG. 1 is a schematic diagram illustrating an example wireless communication system including an aspect of a pilot estimation component according to the present disclosure.

Referring to FIG. 1, in an aspect, a wireless communication system 10 includes a user equipment (UE) 14 having a pilot estimation component 40 configured to facilitate improving pilot channel estimates. UE 14 may communicate wirelessly with one or more wireless nodes, including, but not limited to, a serving wireless node 12 via one or more wireless links 18. Serving wireless node 12 may be configured to transmit one or more signals 20 to UE 14 over the one or more channels, which may include a synchronization channel (SCH) signal 43 and a common pilot channel (CPICH) signal 44. In an aspect, for example, SCH signal 43 may include a primary synchronization channel (PSCH) signal 33, a secondary synchronization channel (SSCH) signal 35, and a primary scrambling code (PCH) signal 37. Also, for example, CPICH signal 44 includes one or more pilot symbols 39. Further, in an aspect, UE 14 and hence pilot estimation component 40 may receive SCH signal 43 in a same portion of a slot of the frame as CPICH signal 44.

Pilot estimation component 40 is configured to determine the PSCH signal 33, the SSCH signal 35, and PCH signal 37 corresponding to the portion of the slot of the frame, and sum the determined PSCH signal 33, SSCH signal 35, and PCH signal 37 over the portion of the slot of the frame to define a summed signal 21. Pilot estimation component 40 is further configured to de-spread pilot symbol 39 over the portion of the slot of the frame based on the summed signal 21, and generate an estimated pilot symbol 23 for the portion of the slot of the frame, where estimated pilot symbol 23 is a sum of the de-spread PSCH signal, de-spread SSCH signal, and de-spread PCH signal. Estimated pilot symbol 23 may then be used to generate a pilot channel estimation 25. In other words, pilot estimation component 40 is configured uncover the SCH, and add energy in SCH symbol coherently with the CPICH symbol. As a result, pilot estimation component 40 may provide pilot channel estimation 25 that increases the signal-to-noise (SNR) of the CPICH symbol, thereby leading to improved pilot channel estimates.

Also used herein, UE 14 may comprise a mobile apparatus and may be referred to as such throughout the present disclosure. Such a mobile apparatus or UE may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, as used herein, the one or more wireless nodes, including, but not limited to, serving wireless node 12 of system 10 may include one or more of any type of network component, such as an access point, including a base station (BS) or node B, a relay, a peer-to-peer device, an authentication, authorization and accounting (AAA) server, a mobile switching center (MSC), a radio network controller (RNC), etc. In a further aspect, the one or more wireless nodes may include one or more small base stations, such as, but not limited to a femtocell, picocell, microcell, or any other small base station.

Figure 2:
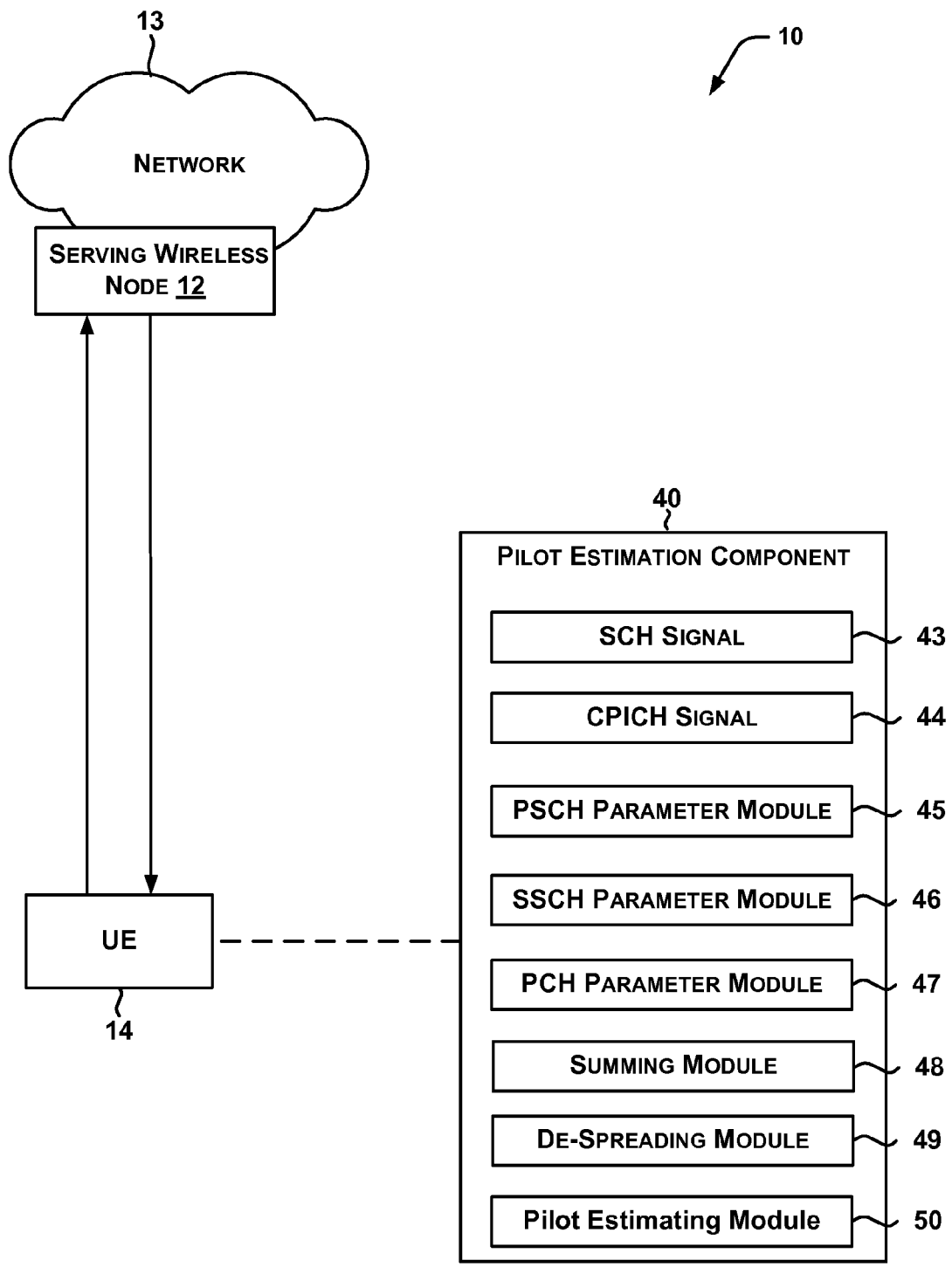
FIG. 2 is a schematic diagram illustrating a more detailed aspect of the pilot estimation component of FIG. 1 in the wireless communication system.

FIG. 2 discloses wireless communication system 10 including a more detailed aspect of UE 14. The wireless communications system 10 may be configured to support communications between a number of users, and FIG. 2 illustrates a manner in which serving wireless node 12, which may be an access point in a network 12, communicates with UE 14. The wireless communication system 10 can be configured for downlink message transmission or uplink message transmission, as represented by the up/down arrows between serving wireless node 12 and UE 14.

In an aspect, as described above, within the UE 14 resides pilot estimation component 40. The pilot estimation component 40 may be configured, among other things, to receive SCH signal 43 that may include includes PSCH signal 33, SSCH signal 35, and PCH signal 37 (see FIG. 1), which may be separated from each other. The pilot estimation component 40 may also be configured to receive part of CPICH signal 44 in the same portion of the slot of the frame as the SCH signal 43, wherein the CPICH signal 44 includes at least one pilot symbol 39 (FIG. 1).

The pilot estimation component 40 may be configured, among other things, to include a PSCH parameter module 45 for receiving PSCH signal 33 embedded in the SCH signal 43 from serving wireless node 12. The PSCH parameter module 45 may also be configured to determine the PSCH signal 33 for a portion of a slot of a frame based on a received PSCH signature, which may be the received version of the PSCH signal 33.

For instance, the PSCH parameter module 45 may be configured to determine the PSCH signal 33 for the first 265 chips in a frame by multiplying the PSCH signature with a conjugate of the PSCH signature for each chip in the first 256 chips to arrive at the PSCH signal 33 for each chip. The summing module 48 may then sum the PSCH signal 33 for each of first 256 chips. Finally, the PSCH parameter module 45 may be configured to de-spread pilot symbol 39 for the first 256 chips based on the sum of the PSCH signals via a de-spreading module 49 residing in pilot estimation component 40.

Further, the pilot estimation component 40 may be configured, among other things, to include an SSCH parameter module 46 for receiving SSCH signal 35 (FIG. 1) embedded in the SCH signal 43 from serving wireless node 12. The SSCH parameter module 46 may also be configured to determine the SSCH signal 35 for a portion of a slot of a frame based on an SCH signature, which may be the received version of the SCH signal 43, in a similar manner as determining the PSCH signal 33 for the first 256 chips in a slot of a frame, as discussed above.

For example, SSCH parameter module 46 may be configured to determine the SSCH signal 35 for the first 265 chips in a frame by multiplying the SSCH signature, which may be the received version of the SSCH signal 35, with a conjugate of the SSCH signature for each chip in the first 256 chips to arrive at the SSCH signal 35 for each chip. The summing module 48 may then sum the SSCH signal 35 for each of first 256 chips. Finally, the SSCH parameter module 46 may be configured to de-spread pilot symbol 39 (FIG. 1) for the first 256 chips based on the sum of the SSCH signals via the de-spreading module 49 residing in pilot estimation component 40.

Additionally, the pilot estimation component 40 may be configured to include a PCH parameter module 47 for receiving PCH signal 37 (FIG. 1) embedded in the SCH signal 43 from serving wireless node 12. The PCH parameter module 47 may also be configured to determine the PCH signal 37 for a portion of a slot of a frame based on a received SCH signature, which may be the received version of the SCH signal 43, in a similar manner as determining the PSCH signal 33 for the first 256 chips in a slot of a frame, as discussed above.

For instance, PCH parameter module 47 may be configured to determine the PCH signal 37 for the first 265 chips in a frame by multiplying the PCH signature, which may be the received version of the PCH signal 37, with a conjugate of the PCH signature for each chip in the first 256 chips to arrive at the PCH signal 37 for each chip. The summing module 48 may then sum the PCH signal 37 for each of first 256 chips. Finally, the PCH parameter module 47 may be configured to de-spread pilot symbol 39 (FIG. 1) for the first 256 chips based on the sum of the PCH signals via the de-spreading module 49 residing in pilot estimation component 40.

Once the PSCH signal 33, SCH signal 35, and the PCH signal 37 of a slot of a frame is determined, a pilot estimating module 50 estimates an estimated pilot symbol 23 (FIG. 1) for the portion of the slot of the frame. For instance, the pilot estimating module 50 estimates the estimated pilot symbol 23 for the first 256 chips in the frame by summing the de-spread PSCH signal, the de-spread SSCH signal, and the de-spread PSC signal.

In another aspect, the pilot estimating module 50 may be configured to estimate the estimated pilot symbol 23 for a portion of a slot of a frame by multiplying the received SCH signal 43 by a conjugate of a composite signal, where the composite signal is a sum of the PSCH signature, SSCH signature, and PSC signature.

Indeed, an algorithm to uncover the PSCH, SSCH, and PCH signal, may include the following:

$p(n) = C_{psc}(n)$
$s(n) = C_{ssc,k}(n)$, where k is index of SSC present in this slot
$c(n) = $ OVSF code for CPICH
$z(n) = n^{th}$ chip of scrambling code corresponding to the slot.
$\alpha = $ pilot symbol amplitude
$\beta = $ PSCH amplitude
$\gamma = $ SSCH amplitude
$n = $ time index for this slot $$x(n) = \begin{cases} \alpha * c(n) * z(n) + \beta * p(n) + \gamma * z(n), & \text{for } 0 \le n \le 255 \\ \alpha * c(n) * z(n), & \text{for } 256 \le n \le 2559 \end{cases}$$

$y(n) = h * x(n) + w(n)$ $$\hat{a}(k) = \sum_{n=k*256}^{(k+1)*256-1} y(n) * \text{conj}\Gamma((n)), \ 0 \le k \le 9$$

$$\Gamma(n) = \begin{cases} c(n) * z(n) + p(n) + s(n), & \text{for } 0 \le n \le 255 \\ c(n) * z(n), & \text{for } 256 \le n \le 2559 \end{cases}$$

Where,
$x(n) \rightarrow$ transmitted signal from node B
$y(n) \rightarrow$ received signal on one multipath
$h \rightarrow$ channel coefficient on that multipath
$w(n) \rightarrow$ AWGN sample
$\hat{a}(k) \rightarrow$ estimated despread pilot symbol
$n \rightarrow$ time index in the slot, $0 \le n \le 2559$ As such, UE 14 of FIG. 2 may include modules, components, or any other means, including pilot estimation component 40, PSCH parameter module 45, SSCH parameter module 46, PCH parameter module 47, pilot estimating module 48, and summing module 49, configured to carry out the above described processes and/or algorithm.

Note that the components of UE 14 may be hardware components specifically configured to carry out the stated processes and/or algorithm, or UE 14 and pilot estimation component 40 may be implemented by a processor configured to perform the stated processes and/or algorithm, or the processes and/or algorithm may be stored within a computer-readable medium for implementation by a processor, or some combination thereof, as will be discussed in more detail with regards to FIGS. 5 and 8.

Thus, the present apparatus and methods include pilot channel estimation that increases the SNR of the CPICH symbol, thereby leading to improved pilot channel estimates.

Figure 3:
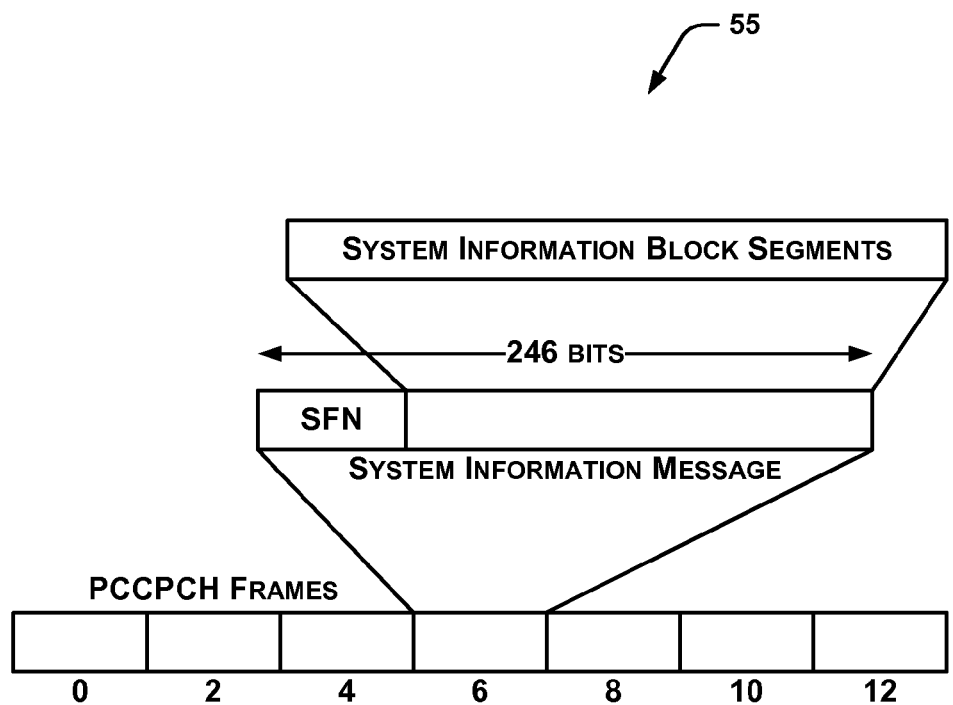
FIG. 3 is schematic diagram illustrating an aspect of a system information message broadcast on Primary Common Control Physical Channel (PCCPCH)

FIG. 3 is schematic diagram illustrating a structure 55 of a system information message broadcast on Primary Common Control Physical Channel (PCCPCH). Generally, every 20 ms, a system information message is broadcast on the PCCPCH. This message encapsulates and segments the Master Information Block (MIB), Scheduling Blocks (SB), and the System Information Blocks (SIB). Note that the MIB may be sent every 80 ms.

As such, the MIB has a value tag which gets incremented every time content of any SIB changes. The MIB also has scheduling info for SBs and SIBs. SIBs contain access stratum and non-access stratum information elements like UE timer values, reselection parameters, power offsets etc. SIB may also include information pertaining to PSCH signal, SSCH signal, and PCH signal.

Therefore, the UE 14 (FIGS. 1 and 2) can know about changes in contents on PCCPCH through the value tag. For example, when the UE 14 reads the SIB for the first time, the UE 14 stores the value tag for that SIB. After that, each time the UE 14 reads the MIB, the UE 14 compares the transmitted value tags with the stored value tags for each SIB. If any value tag has changed, the UE 14 may then re-read the corresponding SIB and update its stored values.

Consequently, in an aspect, the UMTS Terrestrial Radio Access Network (UTRAN) notifies the UE 14 that system information has changed using the Paging Type 1 message on PCH and the System Information Change Indication message on FACH.

In another aspect, SIB Type 7 uses a timer for change control. Each time the UE 14 reads SIB7, it starts an expiration timer. When the timer expires, the UE 14 may re-read that SIB. In an aspect, for example, a typical value of the expiration timer is 640 ms.

In other words, FIG. 3 further illustrates that any code channel whose contents are known at the UE 14, either for a partial or a complete portion of a slot, can be used for pilot estimation of a radio channel.

As such, since the SIB may include information pertaining to PSCH, SSCH, and PCH, UE 14 may be configured to read PSCH, SSCH, and PCH signal information residing in the SIB for pilot estimation.

Thus, the structure 55 of FIG. 3 may be configured perform the functionality of the pilot estimation component 40 (FIG. 2) as described herein.

Figure 4:
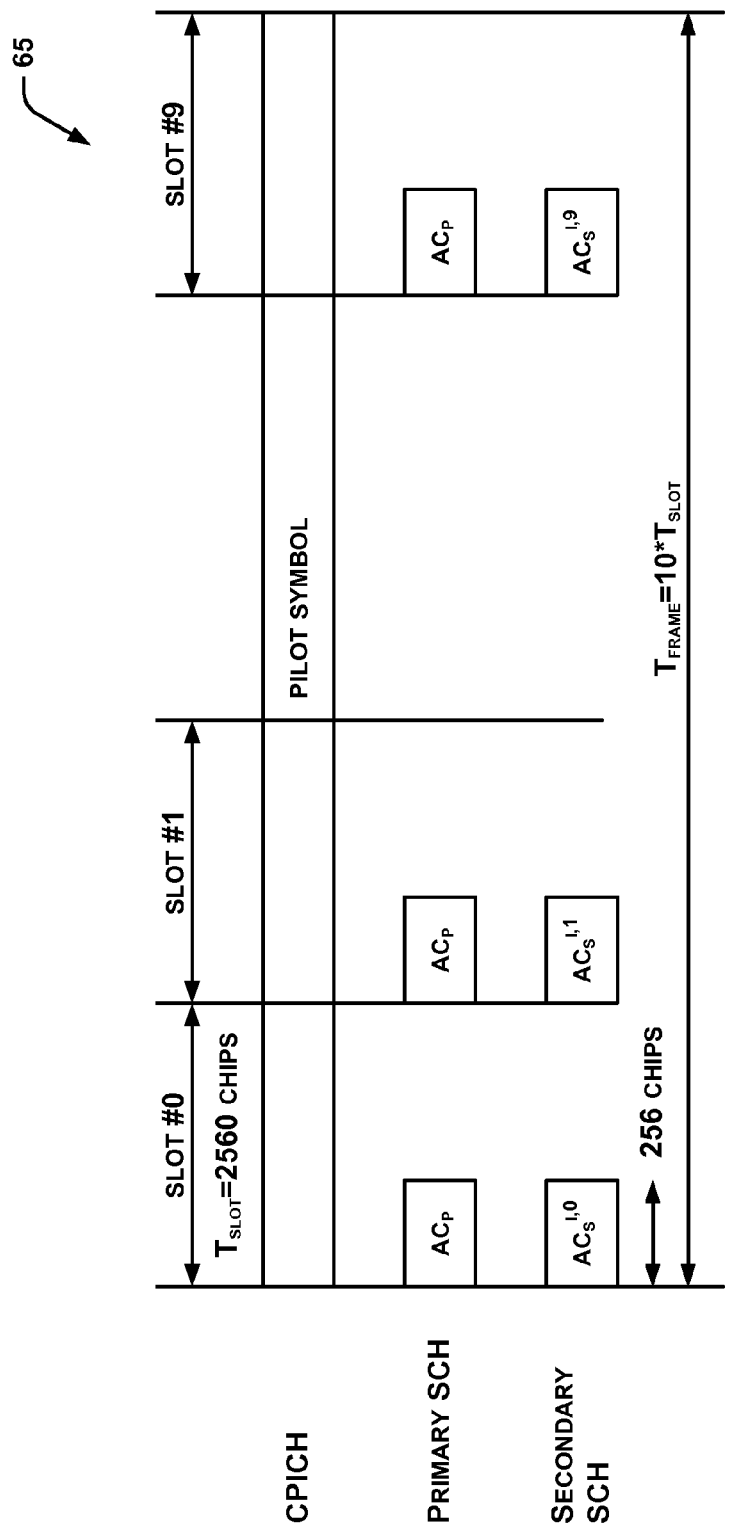
FIG. 4 is schematic diagram illustrating an aspect of a channel structure and codes of an SCH channel.

FIG. 4 is schematic diagram illustrating channel structure 65 and codes of an SCH channel. During communication between UE 14 and serving wireless node 12, a pilot symbol is sent over the CPICH signal for slots #0 to slot #9. Along with the CPICH signal, a PSCH and a SSCH signal is sent for the first 256 chips in the slot. Also note that the SSCH may be configured to represent one of 10 possible secondary synchronization codes of length 256 chips.

In an aspect of this apparatus and method, for illustration, a WCDMA PSCH structure as per 3GPP in FIG. 4 may include the following.

For PSC, Cpsc is constructed as a so-called generalized hierarchical Golay sequence. The PSC is furthermore chosen to have good aperiodic auto correlation properties where: (–a=<x1, x2, x3, . . . , x16>=<1, 1, 1, 1, 1, 1, –1, –1, 1, –1, 1, –1, 1, –1, –1, 1>).

Hence, the PSC is generated by repeating the sequence a modulated by a Golay complementary sequence, and creating a complex-valued sequence with identical real and imaginary components. Therefore the PSC of Cpsc may be defined as: (–Cpsc=(1+j)*<a, a, a, –a, –a, a, –a, –a, a, a, a, –a, a, –a, a, a>).

Note that the leftmost chip in the sequence of FIG. 4 corresponds to the chip transmitted first in time.

In another aspect of this apparatus and method, for illustration, a WCDMA SSCH as per 3GPP in FIG. 4 may include the following.

The 16 secondary synchronization codes (SSCs), $\{C_{ssc,1}, \ldots, C_{ssc,16}\}$, are complex-valued with identical real and imaginary components, and are constructed from position wise multiplication of a Hadamard sequence and a sequence z, defined as: (–z=<b, b, b, –b, b, b, –b, –b, b, –b, b, –b, –b, –b, –b, –b>), and where: (–b=<x1, x2, x3, x4, x5, x6, x7, x8, –x9, –x10, –x11, –x12, –x13, –x14, –x15, –x16> and x1, x2, . . . , x15, x16, are same as in the definition of the sequence "a" above).

Note that the Hadamard sequences are obtained as the rows in a matrix $H_8$ constructed recursively by:

$$H_0 = (1)$$

$$H_k = \begin{pmatrix} H_{k-1} & H_{k-1} \\ H_{k-1} & -H_{k-1} \end{pmatrix}, k \geq 1$$

The rows are numbered from the top starting with row 0 (the all ones sequence). Denote the nth Hadamard sequence as a row of $H_8$ numbered from the top, n=0, 1, 2, ..., 255, in the sequel. Furthermore, let $h_n(i)$ and $z(i)$ denote the i:th symbol of the sequence $h_n$ and z, respectively where i=0, 1, 2, ..., 255 and i=0 corresponds to the leftmost symbol. Note that the kth SSC, $C_{ssc,k}$, k=1, 2, 3, ..., 16 is then defined as:
$(-C_{ssc,k}=(1+j)\times<h_m(0)\times z(0), h_m(1)\times z(1), h_m(2)\times z(2), \ldots, h_m(255)\times z(255)>)$; where m=16×(k−1) and the leftmost chip in the sequence corresponds to the chip transmitted first in time.

The 64 secondary SCH sequences are constructed such that their cyclic-shifts are unique, i.e., a non-zero cyclic shift less than 15 of any of the 64 sequences is not equivalent to some cyclic shift of any other of the 64 sequences. Also, a non-zero cyclic shift less than 15 of any of the sequences is not equivalent to itself with any other cyclic shift less than 15 and one of the 16 SSC is used in each slot.

As such, the channel structure 65 of FIG. 4 may be configured perform the functionality of the pilot estimation component 40 (FIG. 2) as described herein.

Figure 5:
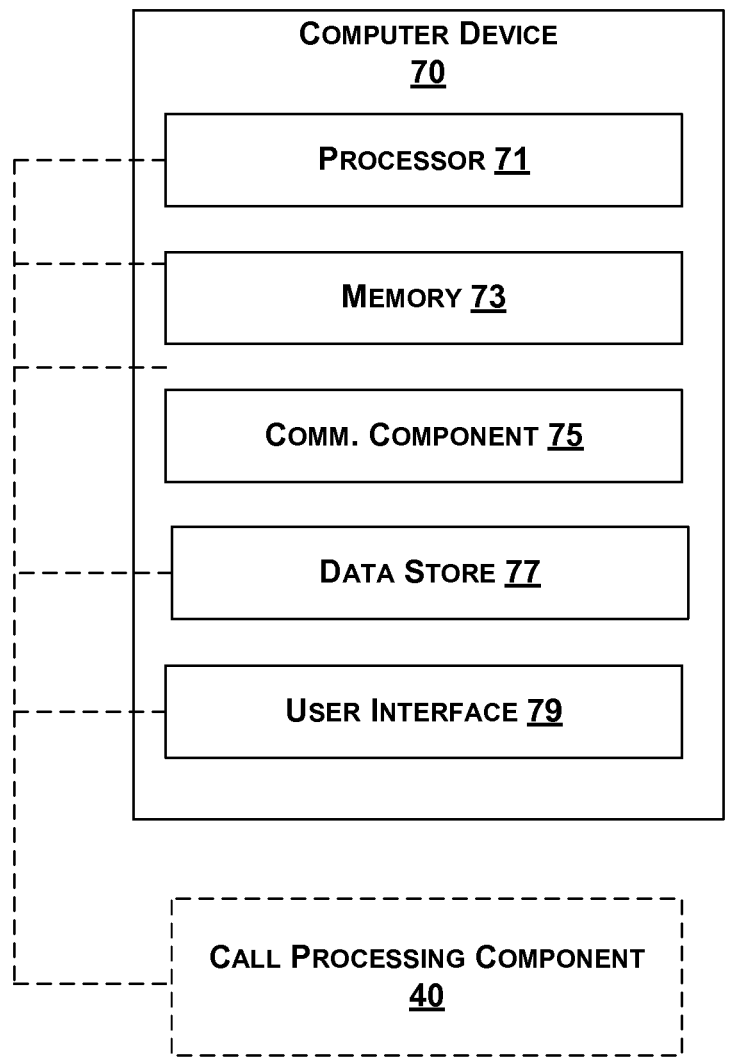
FIG. 5 is a schematic diagram illustrating example components of a computer device according to the present disclosure.

Referring to FIG. 5, in one aspect, UE 14 of FIGS. 1 and/or 2 may be implemented by a specially programmed or configured computer device 70. For example, for implementation as UE 14 (FIGS. 1 and 2), computer device 70 may include one or more components for receiving SCH signal 43 and CICH signal 44 and generating estimated pilot symbol 23 and/or pilot channel estimation 25 (FIG. 1), such as in specially programmed computer readable instructions or code, firmware, hardware, or some combination thereof. Computer device 70 includes a processor 71 for carrying out processing functions associated with one or more of components and functions described herein. Processor 71 can include a single or multiple set of processors or multi-core processors. Moreover, processor 71 can be implemented as an integrated processing system and/or a distributed processing system.

Computer device 70 further includes a memory 73, such as for storing data used herein and/or local versions of applications being executed by processor 71. Memory 73 can include any type of memory usable by a computer, such as random access memory (RAM), read only memory (ROM), tapes, magnetic discs, optical discs, volatile memory, non-volatile memory, and any combination thereof.

Further, computer device 70 includes a communications component 75 that provides for establishing and maintaining communications with one or more parties utilizing hardware, software, and services as described herein. Communications component 75 may carry communications between components on computer device 70, as well as between computer device 70 and external devices, such as devices located across a communications network and/or devices serially or locally connected to computer device 70. For example, communications component 75 may include one or more buses, and may further include transmit chain components and receive chain components associated with a transmitter and receiver, respectively, or a transceiver, operable for interfacing with external devices. In an additional aspect, communications component 75 may be configured to receive one or more pages from one or more subscriber networks.

Additionally, computer device 70 may further include a data store 77, which can be any suitable combination of hardware and/or software, that provides for mass storage of information, databases, and programs employed in connection with aspects described herein. For example, data store 77 may be a data repository for applications not currently being executed by processor 71 and/or any threshold values or finger position values.

Computer device 70 may additionally include a user interface component 79 operable to receive inputs from a user of computer device 70, and further operable to generate outputs for presentation to the user. User interface component 79 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 79 may include one or more output devices, including but not limited to a display, a speaker, a haptic feedback mechanism, a printer, any other mechanism capable of presenting an output to a user, or any combination thereof.

Furthermore, in an optional example, the computer device 70 may include, or may be in communication with, a pilot estimation component 40, which may be configured to perform the functions described in reference to FIGS. 1 and 2.

Figure 6:
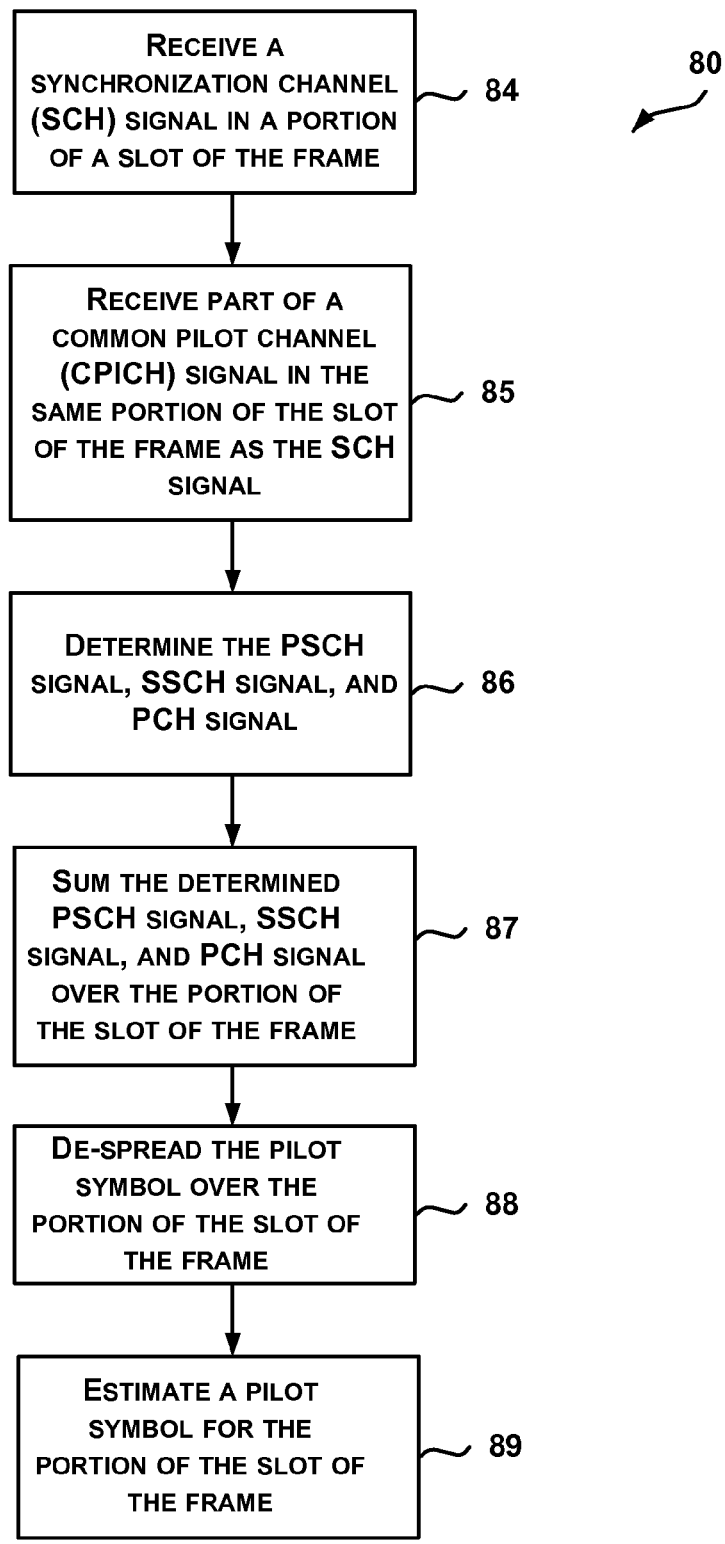
FIG. 6 is a flow diagram illustrating an exemplary method 80 of pilot channel estimation.

FIG. 6 is a flow diagram illustrating an exemplary method 80 of pilot channel estimation. At 84, the UE 14 receives a SCH signal in a portion of a slot of the frame. The received SCH signal includes a PSCH signal, a SSCH signal, and a PCH signal. For example, in an aspect, pilot estimation component 40 residing in UE 14 (FIG. 2) may be configured to receive a SCH signal 43 from serving wireless node 12 in a portion of a slot of the frame that includes a PSCH signal, a SSCH signal, and a PCH signal.

Receiving part of a CPICH signal in the same portion of the slot of the frame as the SCH signal, wherein the CPICH signal includes a pilot symbol occurs at 85. For example, pilot estimation component 40 residing in UE 14 (FIG. 2) may be configured to receive part of a CPICH signal 44 from serving wireless node 12 in the same portion of the slot of the frame as the SCH signal.

At 86, the UE 14 determines the PSCH signal, SSCH signal, and PCH signal corresponding to the portion of the slot of the frame by multiplying the PSCH signature, the SSCH signature, and the PCH signature with a conjugate of the PSCH signature, the SSCH signature, and the PCH signature, respectively, for every chip in the portion of the slot. For example, pilot estimation component 40 residing in UE 14 (FIG. 2) may be configured to determine the PSCH signal via PSCH parameter module 45, SSCH signal via SSCH parameter module 46, and PCH signal via PCH parameter module 47, corresponding to the portion of the slot of the frame.

The UE 14 sums the determined PSCH signal, SSCH signal, and PCH signal over the portion of the slot of the frame at 87 and de-spreads the pilot symbol over the portion of the slot of the frame based on the summed PSCH signal, the SSCH signal, and the PCH signal at 88. For example, UE 14 (FIG. 2) may be configured to sum the determined PSCH signal, SSCH signal, and PCH signal over the portion of the slot of the frame via the summing module 49 and de-spreads the pilot symbol over the portion of the slot of the frame on the summed PSCH signal, the SSCH signal, and the PCH signal via the de-spreading module 49.

Finally, at 89, the UE 14 estimates an estimated pilot symbol for the portion of the slot of the frame such that the estimated pilot symbol is a sum of the de-spread PSCH signal, de-spread SSCH signal, and de-spread PCH signal. For example, UE 14 (FIG. 2) may be configured to estimate an estimated pilot symbol for the portion of the slot of the frame via pilot estimation module 48 such that the estimated pilot symbol is a sum of the de-spread PSCH signal, de-spread SSCH signal, and de-spread PCH signal.

Thus, the UE executing method 80 may be UE 14 (FIG. 2) executing the pilot estimation component 40 (FIG. 2), or respective components thereof.

Figure 7:
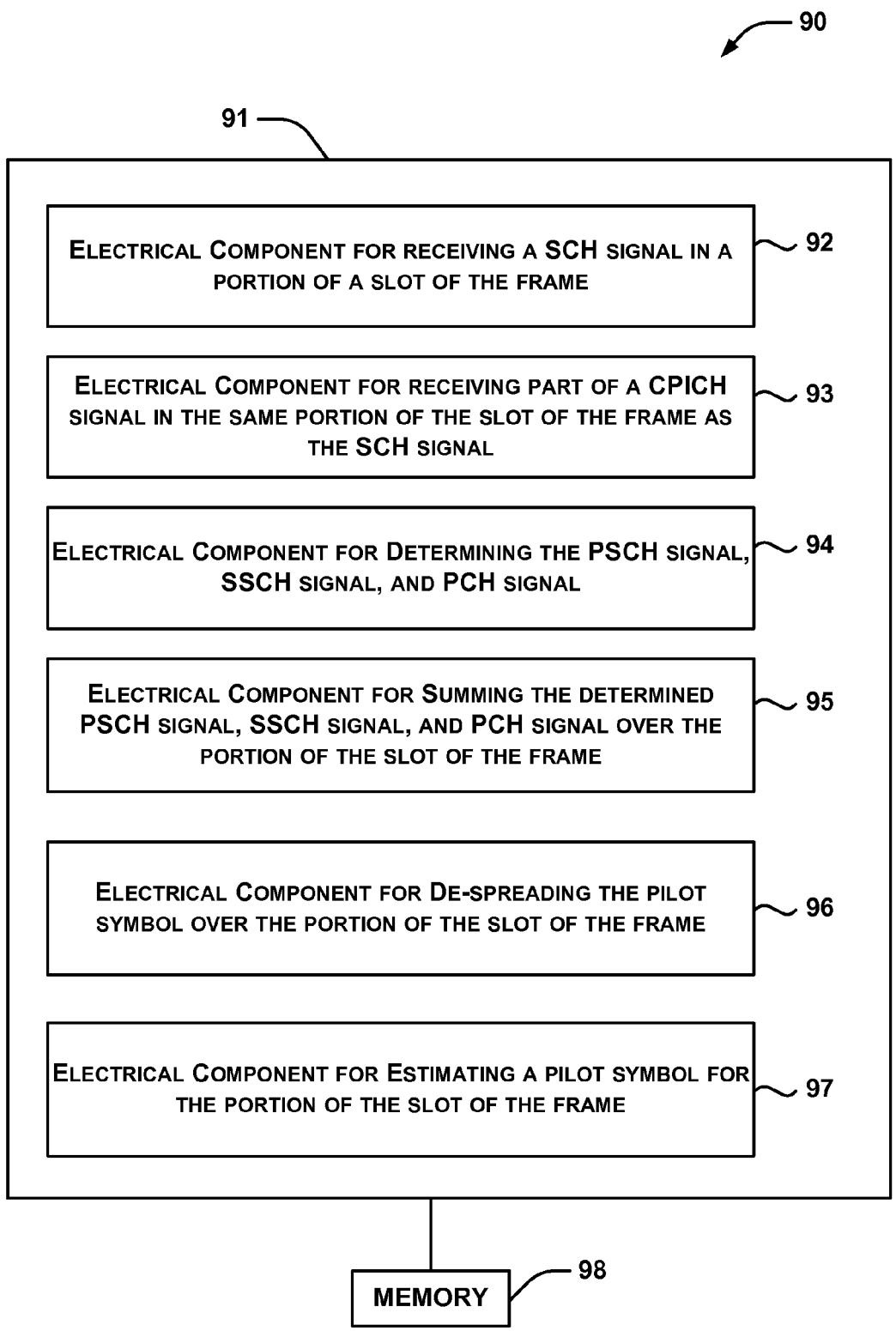
FIG. 7 is a component diagram illustrating aspects of a logical grouping of electrical components as contemplated by the present disclosure.

Referring to FIG. 7, an example system 90 is displayed for improved and simplified channel condition feedback to a serving wireless node. For example, system 90 can reside at least partially within UE 14 of FIGS. 1 and 2. It is to be appreciated that system 90 is represented as including functional blocks, which can be functional blocks that represent functions implemented by a processor, software, or combination thereof (e.g., firmware). For example, system 90 may be implemented via processor 71, memory 73 communications component 75 and data store 77 of FIG. 5, by for example, processor 71 executing software stored by memory 73 and/or data store 77.

Example system 90 includes a logical grouping 91 of electrical components that can act in conjunction. For instance, logical grouping 91 can include an electrical component 92 for receiving a SCH signal in a portion of a slot of the frame, which includes a PSCH signal, a SSCH signal, and a PCH signal. In an aspect, electrical component 92 may include call processing module 40 (FIGS. 1 and 2).

Additionally, logical grouping 91 can include an optional electrical component 93 for receiving part of a CPICH signal in the same portion of the slot of the frame as the SCH signal wherein the CPICH signal includes a pilot symbol. In an aspect, electrical component 93 may include call processing module 40 (FIGS. 1 and 2).

In an additional aspect, logical grouping 91 can include an electrical component 94 for determining the PSCH signal, SSCH signal, and PCH signal. In an aspect, electrical component 94 may include call processing module 40 (FIGS. 1 and 2) configured for determining the PSCH signal, SSCH signal, and PCH signal via a PSCH parameter module 45, SSCH parameter module 46, and PCH parameter module 47, respectively.

Logical grouping 91 can include an electrical component 95 for summing the determined PSCH signal, SSCH signal, and PCH signal over the portion of the slot of the frame. In an aspect, electrical component 95 may comprise summing the determined PSCH signal, SSCH signal, and PCH signal via the summing module 48 residing in call processing component 40 (FIG. 2).

Logical grouping 91 can include an electrical component 96 for de-spreading the pilot symbol over the portion of the slot of the frame based on the summed PSCH signal, the SSCH signal, and the PCH signal. In an aspect, electrical component 96 may comprise de-spreading the summed PSCH signal, the SSCH signal, and the PCH signal via the de-spreading module 49 residing in call processing component 40 (FIG. 2).

Last, logical grouping 91 can include an electrical component 97 for estimating an estimated pilot symbol for the portion of the slot of the frame such that the estimated pilot symbol is a sum of the de-spread PSCH signal, de-spread SSCH signal, and de-spread PCH signal. In an aspect, electrical component 97 may comprise estimating a estimated pilot symbol via the pilot estimating module 50 residing in call processing component 40 (FIG. 2).

Electrical components 92-97 may correspond to one or more components in FIG. 2, and such components may be separate physical components, components implemented by processor 71 (FIG. 5), or a combination thereof.

Additionally, system 90 can include a memory 98 that retains instructions for executing functions associated with the electrical components 92-97, stores data used or obtained by the electrical components 92-97, etc. While shown as being external to memory 98, it is to be understood that one or more of the electrical components 92-97 can exist within memory 98. In one example, electrical components 92-97 can comprise at least one processor, or each electrical component 92-97 can be a corresponding module of at least one processor. Moreover, in an additional or alternative example, electrical components 92-97 can be a computer program product including a computer readable medium, where each electrical component 92-97 can be corresponding code.

Figure 8:
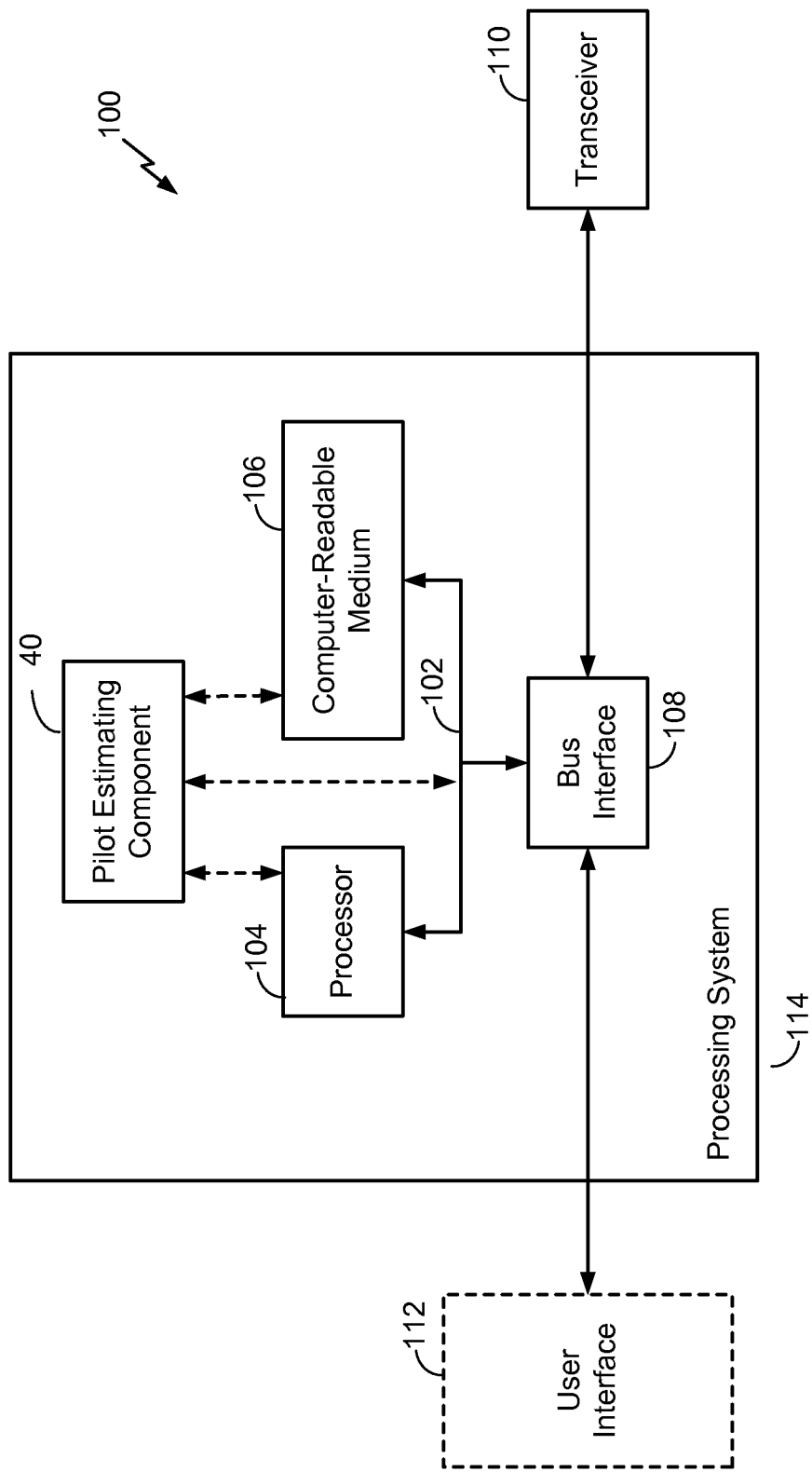
FIG. 8 is a schematic diagram illustrating an example of a hardware implementation for an apparatus employing a processing system to perform the functions described herein.

FIG. 8 is a block diagram illustrating an example of a hardware implementation for an apparatus 100 employing a processing system 114 for carrying out improved channel quality feedback, such as for implementing pilot estimating component 40 (FIG. 2). In this example, the processing system 114 may be implemented with a bus architecture, represented generally by a bus 102. The bus 102 may include any number of interconnecting buses and bridges depending on the specific application of the processing system 114 and the overall design constraints. The bus 102 links together various circuits including one or more processors, represented generally by the processor 104, computer-readable media, represented generally by the volatile or/or non-volatile computer-readable storage medium 106, and one or more components described herein, such as, but not limited to, the pilot estimating component 40 (FIG. 2). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 702 and general processing, including the execution of software stored on the computer-readable storage medium 106. The software, when executed by the processor 104, causes the processing system 114 to perform the various functions described infra for any particular apparatus. The computer-readable storage medium 106 may also be used for storing data that is manipulated by the processor 104 when executing software. Note that each and every element/component module/means of FIGS. 1-5 may be implemented by processor 104 and computer-readable medium 106, which causes the processing system 114 to perform the various functions/processes/algorithms described in FIGS. 1-5.

Thus, call processing component 30/40 may be a separate physical component, or a component implemented by processor 104 or stored in computer-readable storage medium 106, or a combination thereof.

Figure 9:
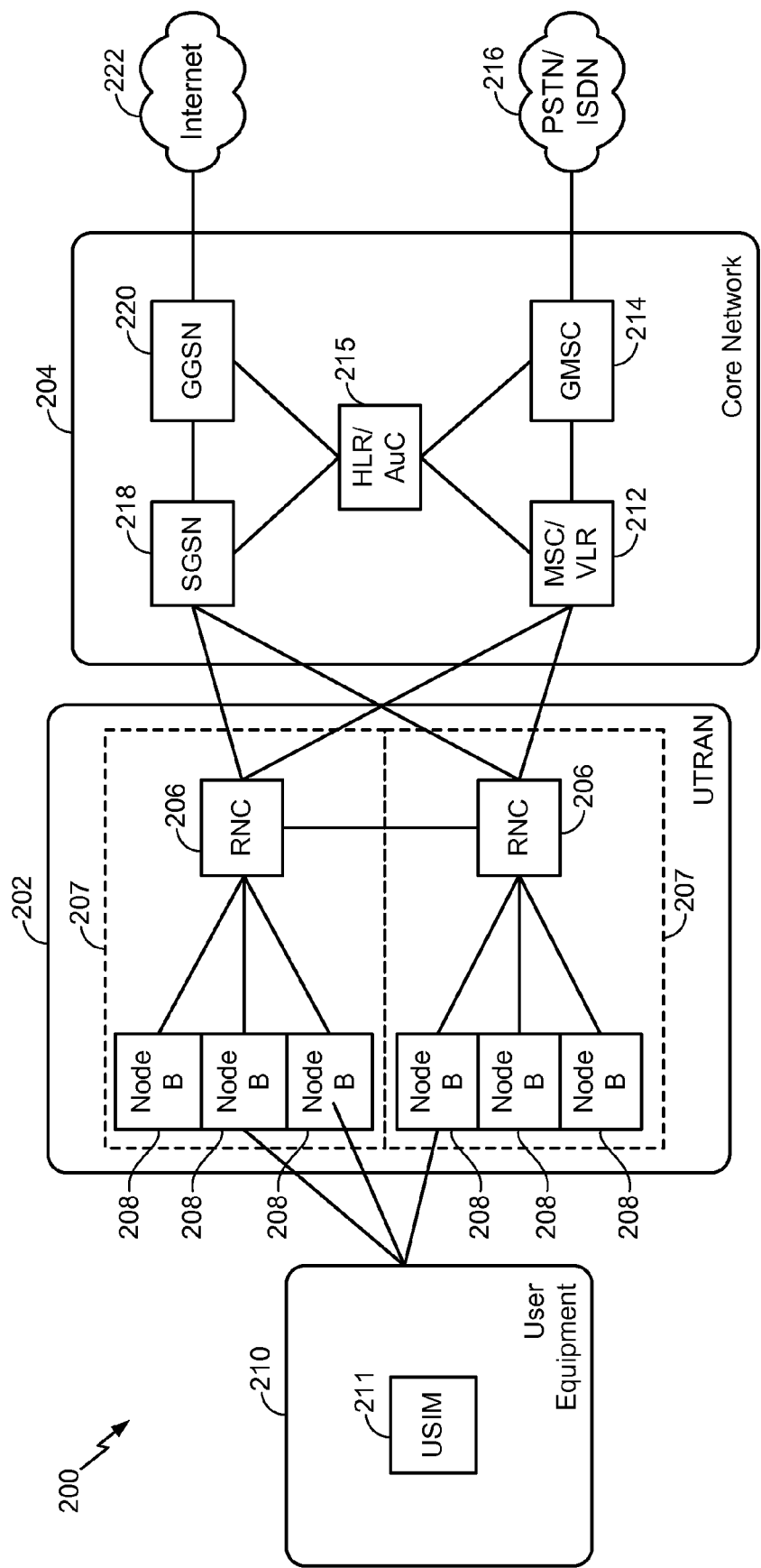
FIG. 9 is a schematic diagram conceptually illustrating an example of a telecommunications system including a UE configured to perform the functions described herein.

Referring to FIG. 9, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. Node B 208 and/or UE 210, respectively represented as serving wireless node 12 and UE 14 of FIG. 1, may be configured to include, for example, the pilot estimation component 40 (FIG. 2) as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the channel quality indicator (CQI) and protocol control information (PCI)

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 10:
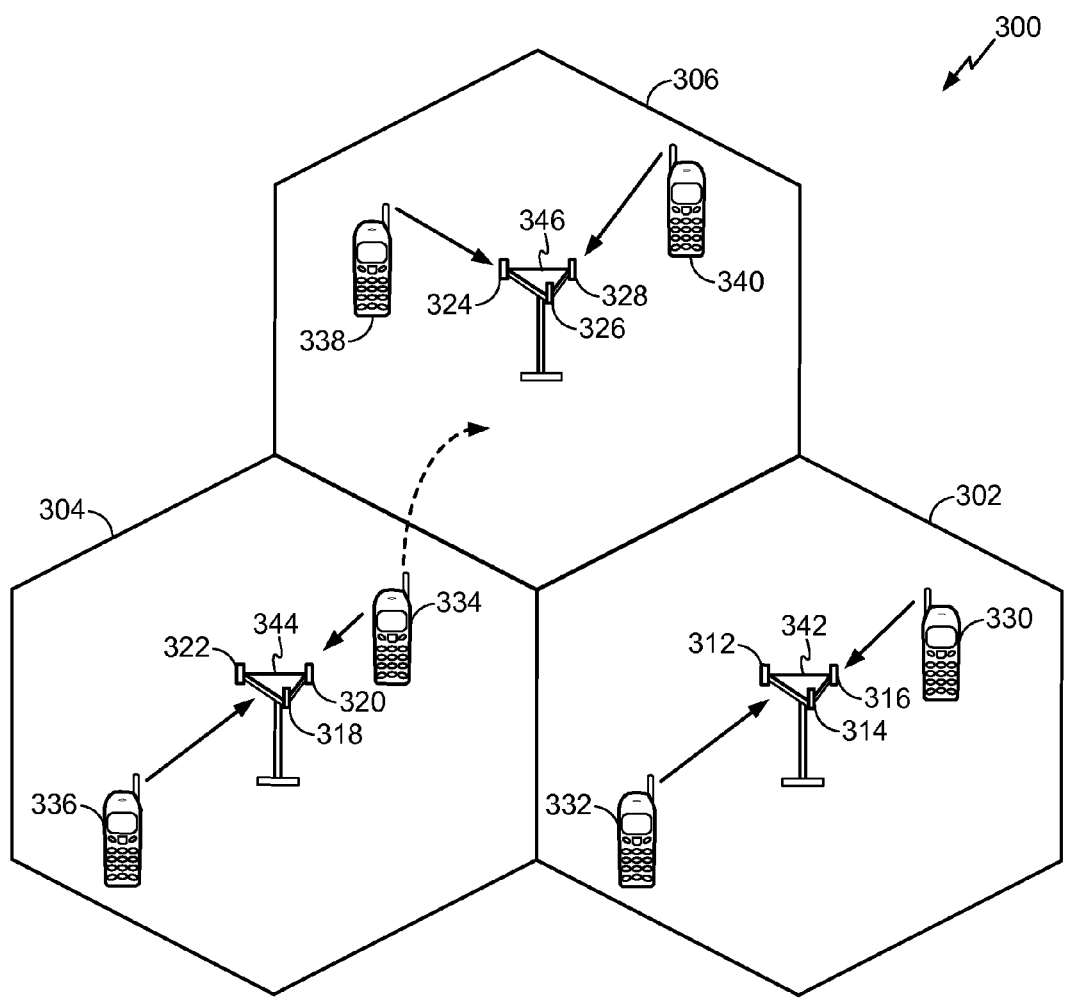
FIG. 10 is a schematic diagram illustrating an example of an access network for use with a UE configured to perform the functions described herein.

Referring to FIG. 10, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 9) for all the UEs 330, 332, 334, 336, 338, 340 in the respective cells 302, 304, and 306. Node Bs 342, 344, 346 and UEs 330, 332, 334, 336, 338, 340, respectively represented as serving wireless node 12 and UE 14 of FIG. 2, may be configured to include, for example, the pilot estimation component 40 (FIG. 2) as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 9), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 11.

Figure 11:
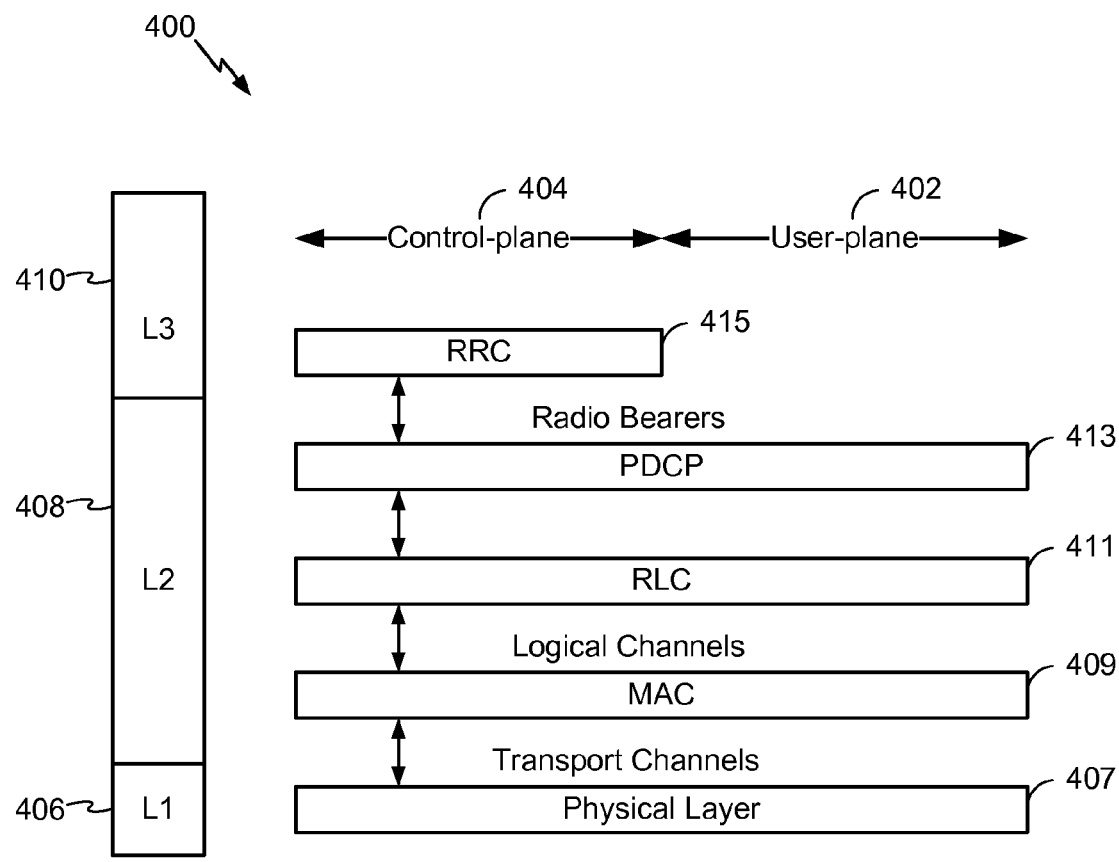
FIG. 11 is a schematic diagram illustrating an example of a radio protocol architecture for the user and control planes for a base station and/or a UE configured to perform the functions described herein.

FIG. 11 is a conceptual diagram illustrating an example of the radio protocol architecture 400 for the user plane 402 and the control plane 404 of a user equipment (UE) or node B/base station. For example, architecture 400 may be included in a network entity and/or UE such as serving wireless node 12 and/or UE 14 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 12:
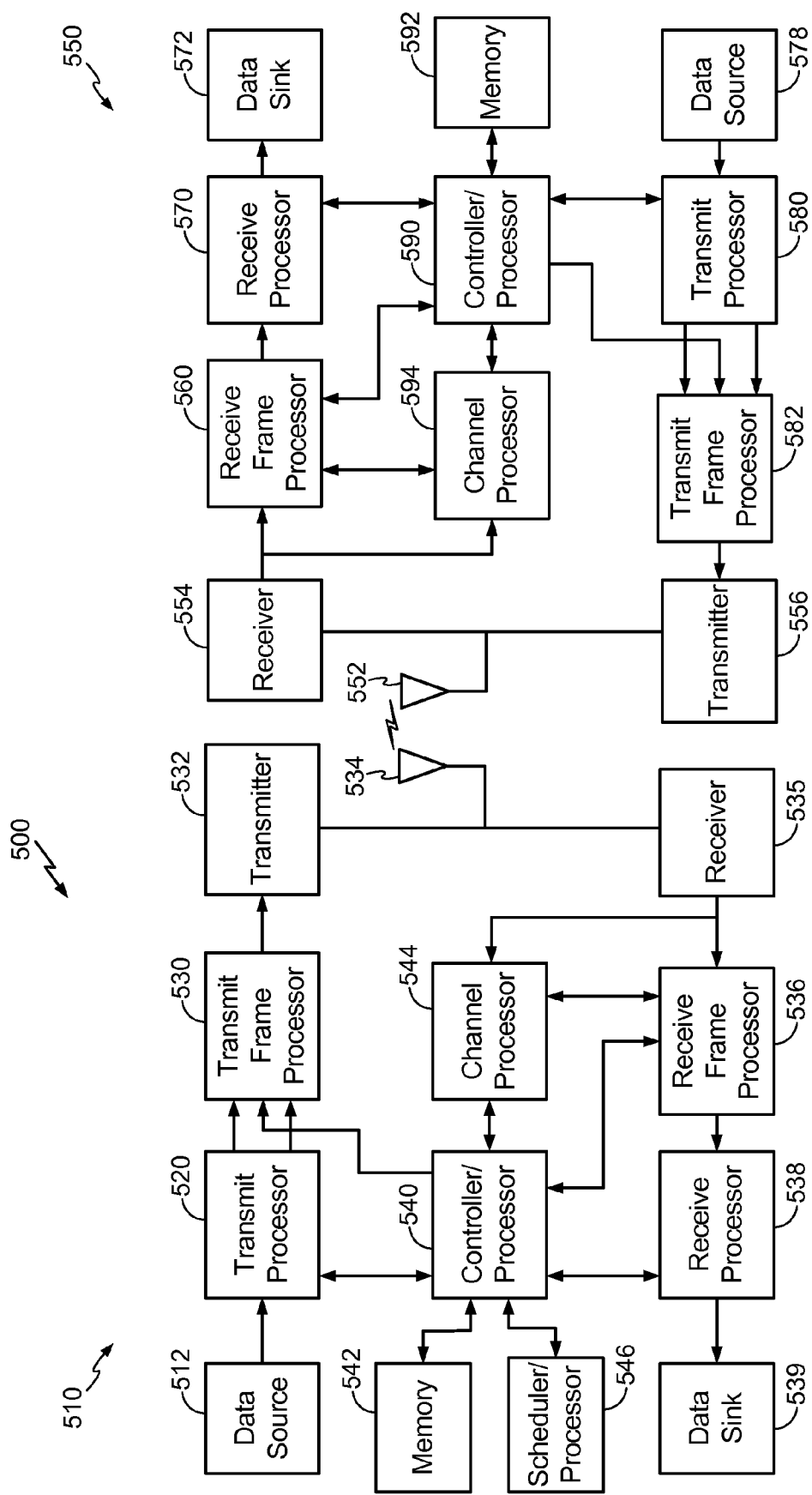
FIG. 12 is a schematic diagram conceptually illustrating an example of a Node B in communication with a UE in a telecommunications system configured to perform the functions described herein.

FIG. 12 is a block diagram of a communication system 500 including a Node B 510 in communication with a UE 550, where Node B 510 may be an entity such as serving wireless node 12 and the UE 550 may be UE 14 according to the aspect described in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames.

The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor 104 (FIG. 8) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106 (FIG. 8). The computer-readable medium 106 (FIG. 8) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication by a user equipment (UE) in a wireless communication network, comprising:
   receiving a synchronization channel (SCH) signal in a portion of a slot of a frame, the SCH signal including a primary synchronization channel (PSCH) signal, a secondary synchronization channel (SSCH) signal, and a primary scrambling code (PCH) signal;
   receiving part of a common pilot channel (CPICH) signal in a same portion of the slot of the frame as the SCH signal, wherein the CPICH signal includes a pilot symbol;
   determining the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot;
   summing the determined PSCH signal, SSCH signal, and PCH signal over the portion of the slot of the frame;
   de-spreading the pilot symbol over the portion of the slot of the frame based on the summed PSCH signal, the SSCH signal, and the PCH signal; and
   estimating an estimated pilot symbol for the portion of the slot of the frame such that the estimated pilot symbol is a sum of the de-spread PSCH signal, de-spread SSCH signal, and de-spread PCH signal.

2. The method of claim 1, wherein the portion of the slot of the frame includes a first 256 chips of the slot.

3. The method of claim 1, wherein estimating the estimated pilot symbol for the portion of the slot of the frame comprises estimating by multiplying the received SCH signal by a conjugate of a composite signal, wherein the composite signal is a sum of the PSCH signature, the SSCH signature, and the PSC signature.

4. The method of claim 1, wherein estimating the estimated pilot symbol for portion of the slot of the frame is based on a Primary Common Control Physical Channel (PCCPCH) signal.

5. The method of claim 1, wherein the PSCH signal, SSCH signal, and the PCH signal are included in a system information block (SIB) received at the UE.

6. The method of claim 5, wherein a master information block comprises scheduling information for the SIB.

7. The method of claim 5, wherein the SIB comprises access stratum and non-access stratum information elements including one or more of UE timer values, reselection parameters, and power offsets.

8. The method of claim 1, wherein the PSCH signal and the SSCH signal comprise a synchronization code for a length of a first 256 chips of the slot.

9. The method of claim 8, wherein the SSCH signal is operable to represent one of 10 possible secondary synchronization codes having a length of 256 chips.

10. The method of claim 9, wherein the secondary synchronization codes are constructed from a position wise multiplication of a Hadamard sequence and a sequence z.

11. An apparatus for wireless communication in a wireless communication network, comprising:
    means for receiving a synchronization channel (SCH) signal in a portion of a slot of a frame, the SCH signal including a primary synchronization channel (PSCH) signal, a secondary synchronization channel (SSCH) signal, and a primary scrambling code (PCH) signal;
    means for receiving part of a common pilot channel (CPICH) signal in a same portion of the slot of the frame as the SCH signal, wherein the CPICH signal includes a pilot symbol;
    means for determining the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot;
    means for summing the determined PSCH signal, SSCH signal, and PCH signal over the portion of the slot of the frame;
    means for de-spreading the pilot symbol over the portion of the slot of the frame based on the summed PSCH signal, the SSCH signal, and the PCH signal; and
    means for estimating an estimated pilot symbol for the portion of the slot of the frame such that the estimated pilot symbol is a sum of the de-spread PSCH signal, de-spread SSCH signal, and de-spread PCH signal.

12. The apparatus of claim 11, wherein the portion of the slot of the frame includes a first 256 chips of the slot.

13. The apparatus of claim 11, wherein the means for estimating the estimated pilot symbol for the portion of the slot of the frame comprises means for multiplying the received SCH signal by a conjugate of a composite signal, wherein the composite signal is a sum of the PSCH signature, the SSCH signature, and the PSC signature.

14. A computer program product, comprising:
    a non-transitory computer readable medium comprising code for:
      receiving a synchronization channel (SCH) signal in a portion of a slot of a frame, the SCH signal including a primary synchronization channel (PSCH) signal, a secondary synchronization channel (SSCH) signal, and a primary scrambling code (PCH) signal;
      receiving part of a common pilot channel (CPICH) signal in a same portion of the slot of the frame as the SCH signal, wherein the CPICH signal includes a pilot symbol;
      determining the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot;
      summing the determined PSCH signal, SSCH signal, and PCH signal over the portion of the slot of the frame;
      de-spreading the pilot symbol over the portion of the slot of the frame based on the summed PSCH signal, the SSCH signal, and the PCH signal; and
      estimating an estimated pilot symbol for the portion of the slot of the frame such that the estimated pilot symbol is a sum of the de-spread PSCH signal, de-spread SSCH signal, and de-spread PCH signal.

15. The non-transitory computer readable medium of claim 14, wherein the portion of the slot of the frame includes a first 256 chips of the slot.

16. The non-transitory computer readable medium of claim 14, wherein the code for estimating the estimated pilot symbol for the portion of the slot of the frame comprises code for multiplying the received SCH signal by a conjugate of a composite signal, wherein the composite signal is a sum of the PSCH signature, the SSCH signature, and the PSC signature.

17. An apparatus included in a user equipment (UE) for wireless communication in a wireless communication network, comprising:
   at least one processor; and
   a memory coupled to the least one processor, wherein the at least one processor is configured to:
   receive a synchronization channel (SCH) signal in a portion of a slot of a frame, the SCH signal including a primary synchronization channel (PSCH) signal, a secondary synchronization channel (SSCH) signal, and a primary scrambling code (PCH) signal;
   portion of the slot of the frame as the SCH signal, wherein the CPICH signal includes a pilot symbol;
   determine the PSCH signal, SSCH signal, and PCH signal corresponding to the portion of the slot of the frame by multiplying a PSCH signature, an SSCH signature, and a PCH signature with a conjugate of the PSCH signature, the SSCH signature, and the PCH signature, respectively, for every chip in the portion of the slot;
   sum the determined PSCH signal, SSCH signal, and PCH signal over the portion of the slot of the frame;
   de-spread the pilot symbol over the portion of the slot of the frame based on the summed PSCH signal, the SSCH signal, and the PCH signal; and
   estimate an estimated pilot symbol for the portion of the slot of the frame such that the estimated pilot symbol is a sum of the de-spread PSCH signal, de-spread SSCH signal, and de-spread PCH signal.

18. The apparatus of claim 17, wherein the portion of the slot of the frame includes a first 256 chips of the slot.

19. The apparatus of claim 17, wherein the at least one processor configured to estimate the estimated pilot symbol for the portion of the slot of the frame is further configured to multiply the received SCH signal by a conjugate of a composite signal, wherein the composite signal is a sum of the PSCH signature, the SSCH signature, and the PSC signature.

20. The apparatus of claim 17, wherein the at least one processor configured to estimate the estimated pilot symbol for the portion of the slot of the frame is further configured to estimate based on a PCCPCH signal.

21. The apparatus of claim 17, wherein the PSCH signal, the SSCH signal, and the PCH signal are included in a system information block (SIB) received at the UE.

22. The apparatus of claim 21, wherein a mast information block comprises scheduling information for the SIB.

23. The apparatus of claim 21, wherein the SIB comprises access stratum and non-access stratum information elements including one or more of UE timer values, reselection parameters, and power offsets.

24. The apparatus of claim 17, wherein the PSCH signal and the SSCH signal comprise a synchronization code having a length of a first 256 chips of the slot.

25. The apparatus of claim 24, wherein the SSCH signal is operable to represent one of 10 possible secondary synchronization codes having a length of 256 chips.

26. The apparatus of claim 25, wherein the secondary synchronization codes are constructed from a position wise multiplication of a Hadamard sequence and a sequence z.

* * * * *